Sept. 13, 1938.   A. S. VAN HALTEREN   2,130,207
WHEEL
Filed April 18, 1935   4 Sheets-Sheet 1

INVENTOR
Andrew S. Van Halteren

Albert L. Ely
ATTORNEY

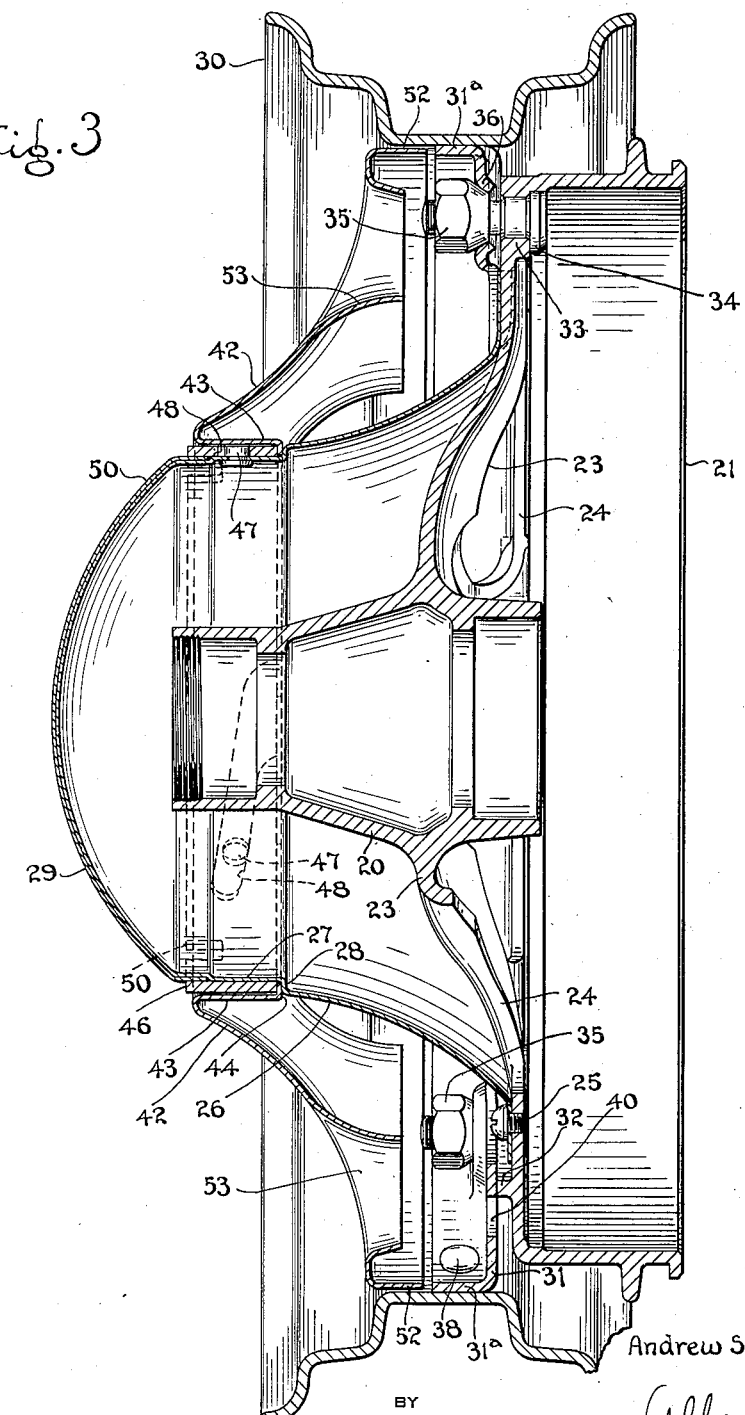

Sept. 13, 1938.   A. S. VAN HALTEREN   2,130,207
WHEEL
Filed April 18, 1935   4 Sheets-Sheet 3
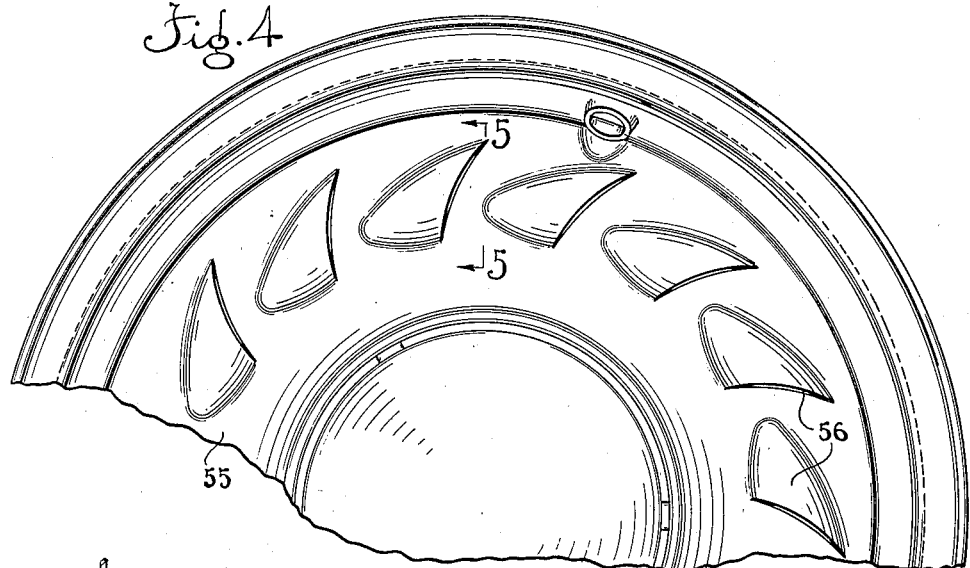
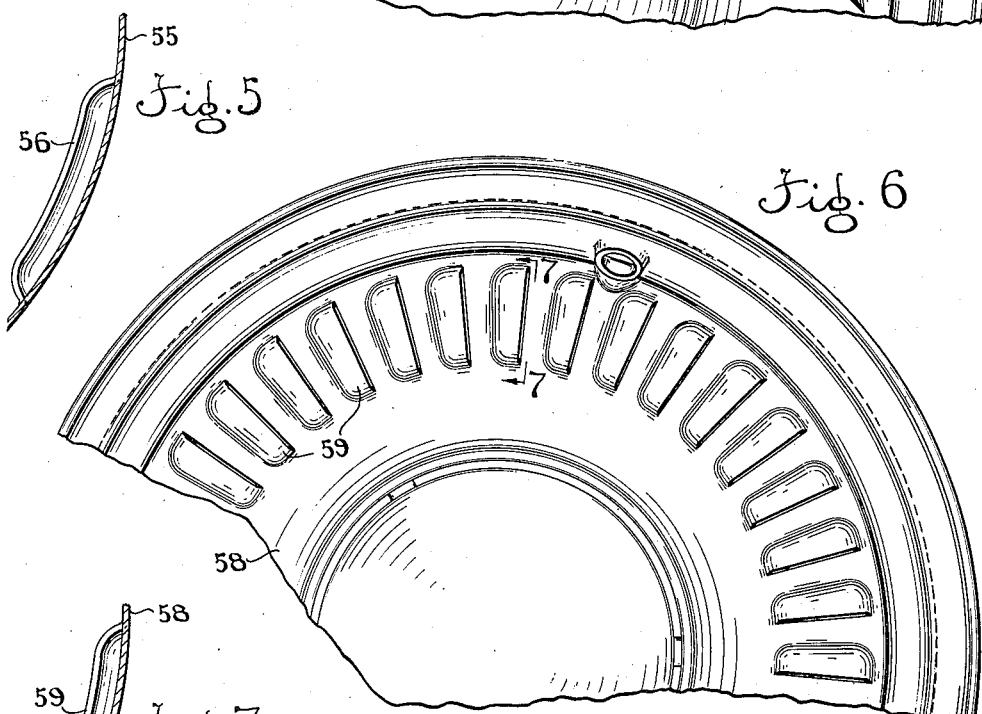
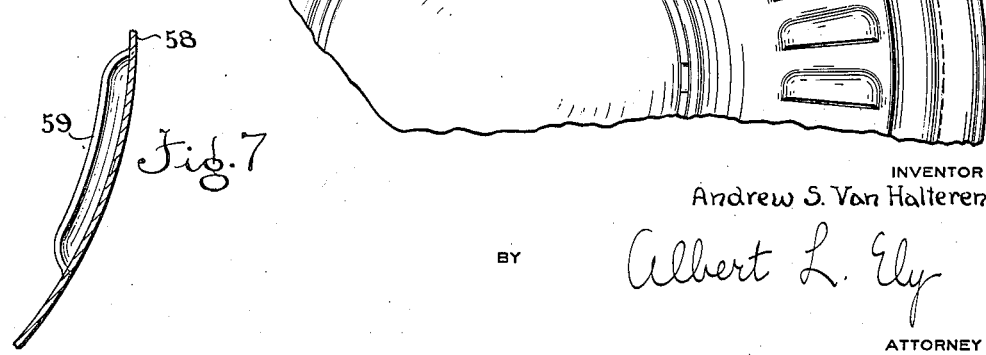
INVENTOR
Andrew S. Van Halteren
BY Albert L. Ely
ATTORNEY Sept. 13, 1938.     A. S. VAN HALTEREN     2,130,207
WHEEL
Filed April 18, 1935     4 Sheets-Sheet 4
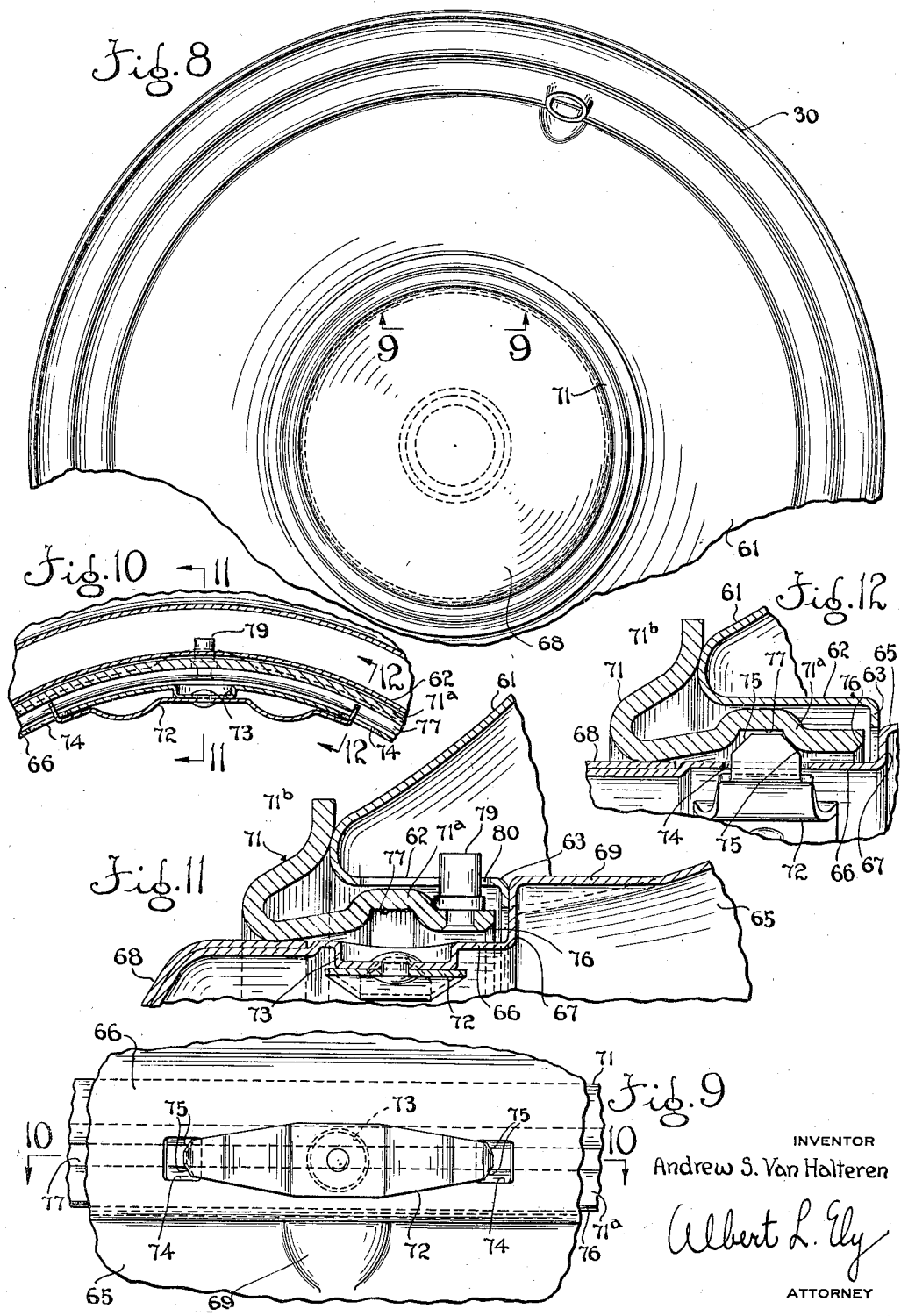
INVENTOR
Andrew S. Van Halteren
Albert L. Ely
ATTORNEY Patented Sept. 13, 1938

2,130,207

UNITED STATES PATENT OFFICE 2,130,207

WHEEL

Andrew S. Van Halteren, Lansing, Mich., assignor to The Firestone Steel Products Company, Akron, Ohio, a corporation of Ohio Application April 18, 1935, Serial No. 17,020

9 Claims. (Cl. 301—37)

This invention relates to vehicle wheels, and more especially it relates to automobile wheels comprising a hub, brake drum, and removable tire-supporting rim.

The widespread use of low-pressure pneumatic tires with corresponding decrease in the diameter of tire rims, and the increased speed of automobiles which has required the use of larger brake drums, has resulted in the common practice of mounting the tire rims directly upon the brake drums. The construction mentioned has not heretofore been without some unsatisfactory features. When the rim had complete circumferential connection with the brake drum, frictional heat from the latter was conducted to the rim with resultant damage to tire and tube, and difficulty was encountered in providing circulation of air about the brake drum to cool the same. When the rim was connected to the brake drum locally by means of attached clamps or lugs at spaced points circumferentially thereof, jars and jolts to the tire and rim were translated to corresponding local regions of the brake drum with the result that the latter became distorted and out of round and subject to unequal wear and impaired efficiency.

The chief objects of this invention are to provide an improved vehicle wheel of the character mentioned wherein heat transfer from brake drum to tire rim largely is avoided; and wherein forces applied locally to the tire and rim are transmitted through an annular drive ring with angular cross-section, to the brake drum, and translated to a relatively large area of the latter.

A further object is to provide a construction which permits the circulation of air to and about the brake drum; to provide an ornamental, concealing cover for the outer face of the wheel; and to provide improved means for retaining the cover in place yet providing readily for the removal thereof. Other objects will be manifest.

Of the accompanying drawings:

Figure 3 is a section on the line 3—3 of Figure 1;

Figure 4 is a fragmentary front elevation of the improved wheel provided with a modified form of ornamental cover;

Figure 5 is a section on the line 5—5 of Figure 4;

Figure 6 is a view similar to Figure 4 showing the improved wheel with another form of ornamental cover thereon;

Figure 7 is a section on the line 7—7 of Figure 6;

Figure 8 is a fragmentary front elevation of the improved wheel provided with an ornamental cover having a modified form of attaching means;

Figure 9 is a section on the line 9—9 of Figure 8;

Figure 10 is a section on the line 10—10 of Figure 9;

Figure 11 is a section on the line 11—11 of Figure 10; and

Figure 12 is a section on the line 12—12 of Figure 10.

Figure 1:
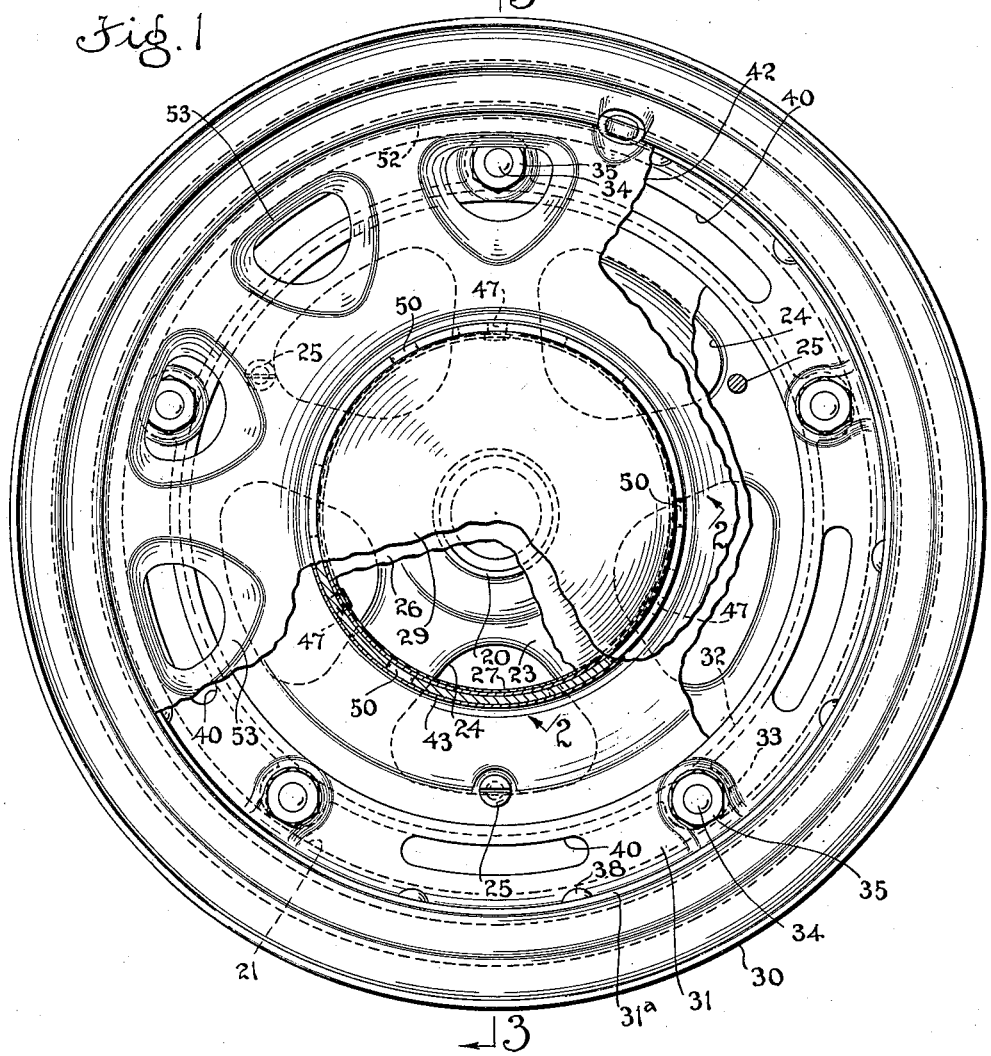
Figure 1 is a front elevation of a vehicle wheel embodying the invention, in its preferred form, parts being broken away and in section for clearness of illustration.

Referring now to the drawings, especially Figures 1 and 3 thereof it will be seen that the improved vehicle wheel comprises a hub 20 and a brake drum 21 which constitute a unitary structure through the agency of an intervening web 23, the latter being apertured at 24, 24 to reduce weight and to conserve material. Secured to the front side of the web 23 by screws 25, 25 is a dust cover 26 that is of general conoidal shape, said dust cover being formed near its apex with a circumferential cylindrical portion 27 that is concentric with the axis of the wheel, the apex of the dust cover being outwardly convex.

A shoulder 28 is formed at the rear margin of cylindrical portion 27. An ornamental hub cap 29 is permanently attached to the apex of the dust cover, the margin of the hub cap extending to the cylindrical portion 27.

The improved vehicle wheel includes a tire-supporting rim 30, herein shown as a drop-center rim although any standard rim with removable side flange may be employed, said rim being removably attached to the brake drum 21 by means of an endless driving ring 31. To this end the front face of the brake drum is formed with a relatively narrow, concentric, upstanding rib 32, Figure 3, outside the base of dust cover 26, said rib merging with a plurality of apertured bosses, such as the boss 33, Figure 3, disposed at equally spaced points circumferentially of said rib 32. Extending through apertured bosses 33 are respective retaining bolts 34 that extend through suitable bolt holes in the driving ring and have coned nuts 35 threaded thereon. Preferably said bolt holes in the driving ring are formed with circumferential beads or tapered marginal flanges 36, Figure 3, which fit flush against the conical portion of nuts 35, the arrangement being such that driving torque is transmitted to the bolts 34 through the nuts 35 whereby shearing of the bolts is obviated, and relative angular movement between driving ring and brake drum is prevented.

The driving ring 31 is angular in transverse section, being formed with a circumferential portion or flange 31a that extends laterally and forwardly from its outer periphery, and engages the inner peripheral face of the rim 30 to which it is permanently secured by a plurality of rivets 38, 38, with the result that the driving ring braces and reinforces the rim. The driving ring is formed with elongate arcuate slots 40, 40 for effecting a circulation of air past the driving ring and into contact with the brake mechanism to cool the said brake mechanism.

The feature of mounting the driving ring 31 on the relatively narrow rib 32 on the brake drum restricts the transfer of heat therebetween, so that the rim is not unduly heated by frictional heat generated during braking.

Removably mounted upon the front of the wheel upon dust cover 26 and extending substantially to rim 30 is an ornamental sheet metal cover 42 of general frusto-conical shape. At its inner, smaller perimeter the cover 42 is inwardly turned so as to provide a concentric cylindrical portion 43 that is somewhat larger than the cylindrical portion 27 of dust cover 26. The inner margin of cylindrical portion 43 is formed with an inwardly directed circumferential flange 44 that defines an opening slightly larger than the outside diameter of cylindrical portion 27. When mounted, the cylindrical portion 43 of cover 42 circumscribes cylindrical portion 27 of dust cover 26 and flange 44 laterally abuts the shoulder 28 at the inner margin of said cylindrical portion 27.

The ornamental cover 42 is retained in place on the dust cover by means of an endless locking ring 46 that is mounted upon cylindrical portion 27, between the latter and cylindrical portion 43, said locking ring being adapted to hold flange 44 of cover 42 firmly against shoulder 28 of dust cover 26. To this end a plurality of studs 47, 47 are riveted upon the outer peripheral surface of cylindrical portion 27, and the locking ring 46 is formed with correspondingly disposed, oblique bayonet slots 48 that open onto its inner margin. The arrangement is such that when the studs 47 are engaged in bayonet slots 48 of the locking ring, angular movement of the latter in one direction will move it axially into engagement with flange 44 of cover 42 and thereby to urge said flange against shoulder 28 as previously described.

Figure 2:
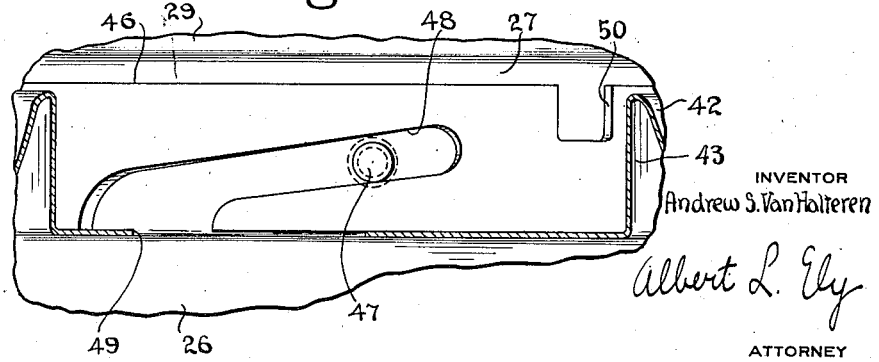
Figure 2 is a section on the line 2—2 of Figure 1.

The outer margin of locking ring 46 is formed with a plurality of notches 50, 50 for the reception of a suitable tool by means of which the locking ring may be angularly turned. The flange 44 of cover 42 is cut away at a plurality of points 49, as shown in Figure 2, so as to pass studs 47 in the mounting of the cover.

The outer perimeter of the cover 42 preferably is formed with a flange 52 that is positioned inside the inner perimeter of rim 30, in spaced relation thereto so that the cover is easily mounted notwithstanding such slight out of roundness as subsequently occurs in most tire rims. The arrangement also avoids noise and squeaks due to any relative movement of the tire rim and ornamental cover. It is desirable that the cover 42 be so constructed that air can pass therethrough for the purpose of circulating about brake drum 21 to cool the same, and to this end said cover is made in simulation of a spoked wheel, with apertures 53, 53 between the simulated spokes.

The invention provides a vehicle wheel of attractive appearance and efficient operation, which is easily assembled and disassembled, and which achieves the other advantages set out in the foregoing statement of objects.

The modified embodiment of the invention shown in Figure 4 is identical with the preferred embodiment previously described with the exception of its ornamental cover 55, which is formed with a circumferential series of louvers 56, 56 that are arcuate in form. In like manner the modified embodiment shown in Figure 7 differs from the preferred embodiment solely in its ornamental cover 58, which is formed with radially disposed louvers 59.

The modified embodiment of the invention shown in Figures 8 to 12 inclusive differs from the previously described embodiments chiefly in the retaining means employed for retaining the ornamental cover on the wheel. Said cover, designated 61, as shown is plain, and has its outer periphery spaced a sufficient distance from the inner periphery of rim 30 to permit air to pass therebetween in adequate volume to cool the brake drum 21.

However, the cover 61 may be formed with louvers or in simulation of a spoked wheel if desired. The inner periphery of cover 61 is inwardly turned so as to provide a concentric cylindrical portion 62, the inner margin of the latter being formed with a radially inwardly directed circumferential flange 63.

This embodiment of the invention includes a conoidal dust cover 65 that is similar to dust cover 26 of the preferred embodiment in that it includes a cylindrical portion 66 near its apex, there being a shoulder 67 formed at the rear margin of said cylindrical portion. An ornamental hub cap 68 is mounted upon the rounded apex of said dust cover. When the ornamental cover 61 is mounted upon the wheel, its cylindrical portion 62 circumscribes and is concentric with the cylindrical portion 66 of dust cover 65, there being greater space between said cylindrical portions however, than between the similar cylindrical portions 27, 43 of the other embodiments of the invention. Therefore in order to provide a suitable abutment against which the flange 63 may bear, when the wheel is completely assembled, the dust cover 65 is embossed at a plurality of points, contiguous with the shoulder 67, to provide upstanding bosses or abutments such as the boss 69, Figure 11.

For retaining the ornamental cover 61 on the wheel there is provided a locking ring 71 and a cooperating spring latch 72. The latter consists of a spring-metal strap that is riveted at its middle to the under side of a boss 73 that is formed on the inner periphery of cylindrical portion 66 of the dust cover, the strap 72 being bowed at each side of its middle and having its respective end portions bent at right angles so as to extend through respective apertures 74, 74 formed in 65 said cylindrical portion. The corners of said end portions of the strap are beveled as shown at 75, 75, Figures 9 and 12.

The locking ring 71 is an endless metal structure having a portion 71a that is adapted to enter the space between the respective cylindrical portions 62, 66 of the ornamental cover and dust cover, and there to releasably engage with the end portions of latch 72 that project into said space through apertures 74. To this end the inner corner of the margin of ring portion 71a is beveled at 76 so as easily to pass over the end portions of latch 72 by depressing the same. Centrally, the inner periphery of ring portion 71a is formed with a circumferential recess or groove 77 in which the end portions of latch 72 are received when the locking ring is in locking position, as is most clearly shown in Figure 12. That portion of the locking ring 71 that is disposed exteriorly of the space between cover 61 and dust cover 65 consists of an outwardly turned circumferential flange 71b that obscures said space and thus prevents dust and dirt from entering the same, and also engages the outer face of the ornamental cover so as to hold said cover in fixed position with its flange 63 against abutments 69. The locking ring 71 and cover 61 are permanently connected to each other by means of a stud 79 that is riveted to ring portion 71a and projects outwardly therefrom into a slot 80 that extends transversely of cylindrical portion 62 of said cover, the arrangement permitting limited, axial, relative movement between the locking ring and cover.

The cover 61 is retained securely in position at all times and there is no possibility of the locking ring 71 becoming accidentally displaced out of locking position. It is easily purposely moved out of locking position by inserting a tool between its flange 71b and cover 61 and prying it forwardly until the ends of latch member 72 are forced out of groove 77. Then cover 61 and locking ring are removed from the wheel as a unit.

Other modifications may be resorted to without departing from the spirit of the invention or the scope thereof as defined by the appended claims.

What is claimed is:

1. In a vehicle wheel having a dust cover mounted thereon and concealing one side thereof, an ornamental cover supported solely by said dust cover, and a separate intermediate ring for removably attaching the ornamental cover to the dust cover, said ring being accessible from the front of the wheel.

2. In a vehicle wheel having a dust cover mounted thereon and concealing one side of the same, an annular ornamental cover supported solely upon said dust cover and a locking ring between the dust cover and the inner perimeter of the ornamental cover for removably connecting said covers to each other, said locking ring being accessible from the front of the wheel.

3. In a vehicle wheel having a conoidal dust cover mounted thereon and concealing one side of the same, said dust cover comprising a local, concentric cylindrical portion, an annular ornamental cover having its inner perimeter positioned about said cylindrical portion of the dust cover, and a locking ring rotatably mounted upon said cylindrical portion and engaging the ornamental cover to retain it in position on the wheel, said dust cover constituting the sole support for said ornamental cover.

4. In a vehicle wheel having a dust cover mounted thereon and enclosing one side of the same, said dust cover comprising a local, cylindrical portion concentric with the wheel formed with a shoulder at the rear margin thereof, an annular ornamental cover having an annular flange at its inner surface, and a locking ring adapted to hold the flange of the ornamental cover firmly against the shoulder of the dust cover, said dust cover constituting the sole support for said ornamental cover.

5. In a vehicle wheel having a dust cover mounted thereon and enclosing one side thereof, said dust cover comprising a local, cylindrical portion concentric with the wheel formed with a shoulder at the rear margin thereof, an ornamental cover supported solely by said dust cover and formed with an annular flange at its inner surface circumscribing said cylindrical portion of the latter, a locking ring rotatably mounted upon said cylindrical portion, and means for moving said locking ring axially as it is rotated for urging the flange on the ornamental cover against the shoulder of the dust cover.

6. In a vehicle wheel having a dust cover mounted thereon and enclosing one side thereof, said dust cover comprising a local, cylindrical portion concentric with the wheel formed with an outwardly extending abutment at one margin thereof, an ornamental cover having its inner surface in circumscribing relation to said cylindrical portion and formed with an inwardly extending flange, a locking ring rotatably mounted upon said cylindrical portion and having oblique slots extending inwardly from its inner margin, and studs projecting from said cylindrical portion adapted to enter said slots whereby the locking ring will move axially when rotated and force the flange on the ornamental cover against the abutment on the dust cover.

7. In a vehicle wheel having a dust cover mounted thereon and enclosing one side thereof, said dust cover comprising a local, cylindrical portion concentric with the wheel formed with an abutment at the rear margin thereof, an annular ornamental cover having its inner surface circumscribing said cylindrical portion and formed with a circumferential, inwardly extending flange, a locking ring permanently associated with the inner surface of the ornamental cover and movable relatively thereof in an axial direction, said locking ring being positionable upon said cylindrical portion, and means on said cylindrical portion for yieldingly engaging said locking ring to hold it in place when the flange on said ornamental cover is against the abutment on the cylindrical portion of the dust cover.

8. A combination as defined in claim 7 in which the locking ring is formed exteriorly with a flange that conceals the space between the dust cover and the ornamental cover.

9. In a vehicle wheel having a dust cover mounted thereon and enclosing one side thereof, said dust cover comprising a local, cylindrical portion concentric with the wheel formed with an abutment at the rear margin thereof, an annular, ornamental cover having its inner surface circumscribing said cylindrical portion and formed with a circumferential, inwardly extending flange, a locking ring positionable over said cylindrical portion of the dust cover permanently associated with the ornamental cover by means of a stud on the locking ring which extends into an axially disposed slot in the ornamental cover, said locking ring being formed with a circumferential groove in its inner surface, and a spring latch on the cylindrical portion of the dust cover adapted to enter said groove in the locking ring to retain the ring on said cylindrical portion when the flange on the ornamental cover is against the abutment on the dust cover.

ANDREW S. VAN HALTEREN.